(12) United States Patent
Volkerink et al.

(10) Patent No.: US 8,320,235 B2
(45) Date of Patent: Nov. 27, 2012

(54) SELF-REPAIR SYSTEM AND METHOD FOR PROVIDING RESOURCE FAILURE TOLERANCE

(75) Inventors: Erik H. Volkerink, San Jose, CA (US); Alan Hart, San Carlos, CA (US)

(73) Assignee: Advantest (Singapore) Pte Ltd, Singapore (SG)

( * ) Notice: Subject to any disclaimer, the term of this patent is extended or adjusted under 35 U.S.C. 154(b) by 1407 days.

(21) Appl. No.: 11/357,227

(22) Filed: Feb. 17, 2006

(65) Prior Publication Data
US 2007/0195691 A1 Aug. 23, 2007

(51) Int. Cl.
*H04L 12/26* (2006.01)
(52) U.S. Cl. ........ 370/216; 370/310; 370/313; 370/314; 709/245; 709/220; 709/221
(58) Field of Classification Search .................. 370/216, 370/310, 313, 314; 709/245, 220, 221
See application file for complete search history.

(56) References Cited

U.S. PATENT DOCUMENTS

| | | | | |
|---|---|---|---|---|
| 5,706,234 A * | 1/1998 | Pilch et al. | ...................... | 365/201 |
| 5,978,370 A * | 11/1999 | Shively | ........................... | 370/370 |
| 6,091,258 A | 7/2000 | McClintock | | |
| 6,167,352 A * | 12/2000 | Kanevsky et al. | ............... | 702/81 |
| 6,462,684 B1 * | 10/2002 | Medelius et al. | ............. | 341/120 |
| 6,778,538 B2 * | 8/2004 | Landaveri et al. | ............ | 370/397 |
| 6,836,756 B1 * | 12/2004 | Gruber | ............................ | 703/19 |
| 2002/0078403 A1 * | 6/2002 | Gullo et al. | ....................... | 714/37 |
| 2003/0061384 A1 * | 3/2003 | Nakatani | ....................... | 709/245 |
| 2004/0186871 A1 * | 9/2004 | Ettorre et al. | ................. | 708/620 |
| 2004/0258408 A1 * | 12/2004 | Ramaswami et al. | ........... | 398/50 |
| 2004/0260813 A1 * | 12/2004 | Heisserman et al. | ......... | 709/226 |
| 2005/0172164 A1 | 8/2005 | Fox | | |
| 2005/0187744 A1 * | 8/2005 | Morrison et al. | .................. | 703/2 |
| 2006/0031488 A1 * | 2/2006 | Swales | ........................... | 709/224 |
| 2006/0179163 A1 * | 8/2006 | Muramatsu et al. | .............. | 710/1 |

FOREIGN PATENT DOCUMENTS

| | | |
|---|---|---|
| GB | 2405006 A | 2/2005 |
| WO | WO 01/11468 A1 | 2/2001 |

OTHER PUBLICATIONS

PCT International Search Report and Written Opinion Dated Jul. 19 2007 for International Application No. PCT/EP2007/001377.

* cited by examiner

*Primary Examiner* — Hassan Kizou
*Assistant Examiner* — Siming Liu
(74) *Attorney, Agent, or Firm* — Holland & Hart LLP

(57) ABSTRACT

A self-repair system provides resource failure tolerance using an interconnection network that provides interconnection information identifying connections between system resources, redundant resources and ports that are connectable to consumers of the system resources. A controller identifies both defective system resources and the affected sinks connected to the defective system resources from the interconnection network. The controller further identifies compatible resources from the system resources and redundant resources that are capable of replacing the defective system resources for each of the affected sinks from the interconnection network. The controller determines a respective cost associated with each of the compatible resources, and in response to the determined costs, selects at least one of the compatible resources as a replacement resource for each of the defective system resources. The controller further configures the interconnection network to connect the replacement resources to the affected ports instead of the defective system resources.

32 Claims, 8 Drawing Sheets

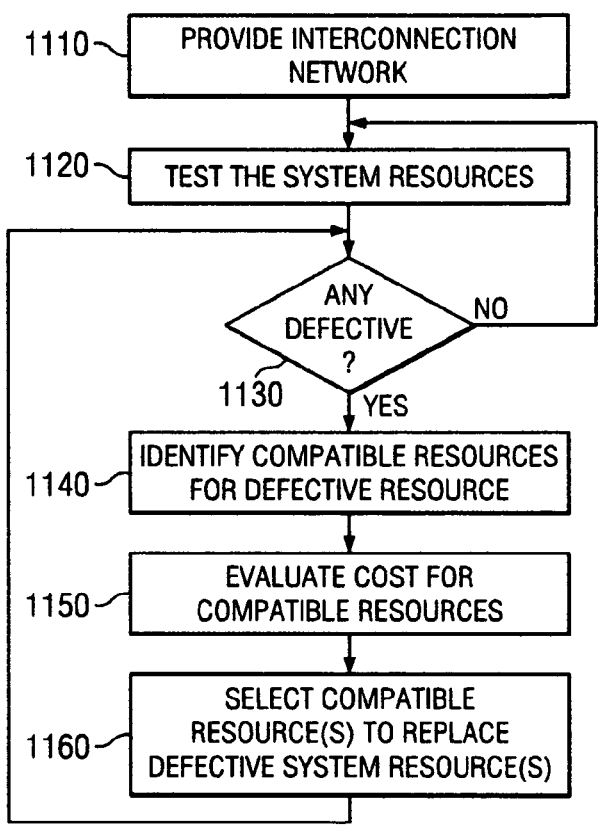
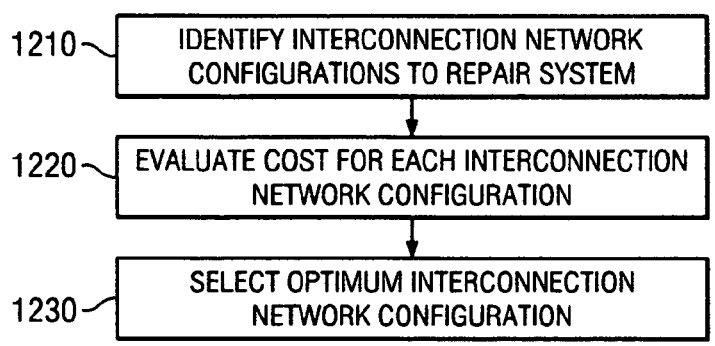

SELF-REPAIR SYSTEM AND METHOD FOR PROVIDING RESOURCE FAILURE TOLERANCE

BACKGROUND OF THE INVENTION

As electronic devices continue to reach higher levels of performance through among others shrinking feature sizes, greater integration and higher clock frequencies, manufacturers of automatic test equipment (ATE) have struggled to improve ATE performance. ATE test systems typically include one or more subsystems to enable testing of one or more devices under test (DUTs) in parallel. Each subsystem corresponds to a system resource that communicates with one or more consumers of such system resource (e.g., a DUT or part of a DUT) during testing of DUTs. A consumer of a system resource is commonly referred to as a "sink." An example of a system resource is a pattern generator that generates and broadcasts a test signal to one or more DUTs.

To improve ATE throughput and reduce the cost of test, there is a current trend towards increasing the number of test resources. However, each test resource has a certain, known failure rate. As a result, increasing the number of resources also increases the overall ATE failure rate and reduces the ATE mean time between failures (MTBF). At one point, any improvement in ATE throughput and cost resulting from increasing the number of test resources further will be offset by the decrease in ATE throughput resulting from the reduced MTBF as well as the additional cost associated with a failure.

In addition, increasing the number of test resources also increases the cost of an ATE test system. As a result, increasing the number of test resources may increase the cost of the ATE test system without providing the desired increase in test throughput. Thus, what is needed is a system architecture that, given a number of resources, maximizes throughput while minimizing the MTBF.

SUMMARY OF THE INVENTION

Embodiments of the present invention provide a self-repair system for providing resource failure tolerance in a system including ports and system resources, in which each of the ports is connectable to a respective resource consumer that consumes one or more of the system resources. The self-repair system includes redundant resources at least partially duplicative of the system resources and an interconnection network connected to the system resources, the redundant resources and the ports. The interconnection network provides interconnection information identifying connections between the system resources and the ports. The self-repair system further includes a resource integrity tester operable to identify a defective one of the system resources and a controller operable to perform the following operations: (1) identifying, in response to the interconnection information, an affected one of the ports connected by the interconnection network to the defective system resource, (2) identifying, from among the system resources and the redundant resources, compatible resources capable of replacing the defective system resource, (3) determining a respective cost of replacing the defective system resource with each of the compatible resources, (4) in response to the determined costs, selecting one of the compatible resources as a replacement resource, and (5) configuring the interconnection network to connect the replacement resource to the affected port instead of the defective system resource.

In one embodiment, the controller is operable to identify connection configurations for the interconnection network, in which each of the connection configurations provides connections between (a) the ports and (b) non-defective ones of the system resources and ones of the redundant resources identified as replacement resources. In a further embodiment, the controller is operable to estimate the mean time between failures for each of the connection configurations to select the connection configuration having the greatest mean time between failures.

In another embodiment, the interconnection network connects more than one of the ports to the defective system resources and the controller is operable to estimate a mean time between failures for each of the affected ports connected to the defective system resource and to select, for each of the affected ports, a respective one of the compatible resources having the greatest mean time between failures. In yet another embodiment, the controller is operable to assign to each of the compatible resources a respective cost depending on the number of switches associated therewith.

Embodiments of the present invention further provide a method for providing resource failure tolerance in a system including ports, system resources and connections therebetween, in which each of the ports is connectable to a respective resource consumer that consumes one or more of the system resources. The method includes providing redundant resources, identifying a defective one of the system resources and an affected one of the ports connected to the defective system resource. The method further includes, from the system resources and redundant resources, identifying compatible resources that are capable of replacing the defective system resource and determining a respective cost of replacing the defective system resource with each of the compatible resources. In response to the determined costs, the method further includes selecting one of the compatible resources as a replacement resource and replacing the defective system resource with the replacement resource.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 11 is a flow chart illustrating an exemplary process for providing resource failure tolerance in a system, in accordance with embodiments of the present invention; and FIG. 12 is a flow chart that illustrates an exemplary process for determining costs, in accordance with embodiments of the present invention.

DETAILED DESCRIPTION OF EXEMPLARY EMBODIMENTS

Figure 1:
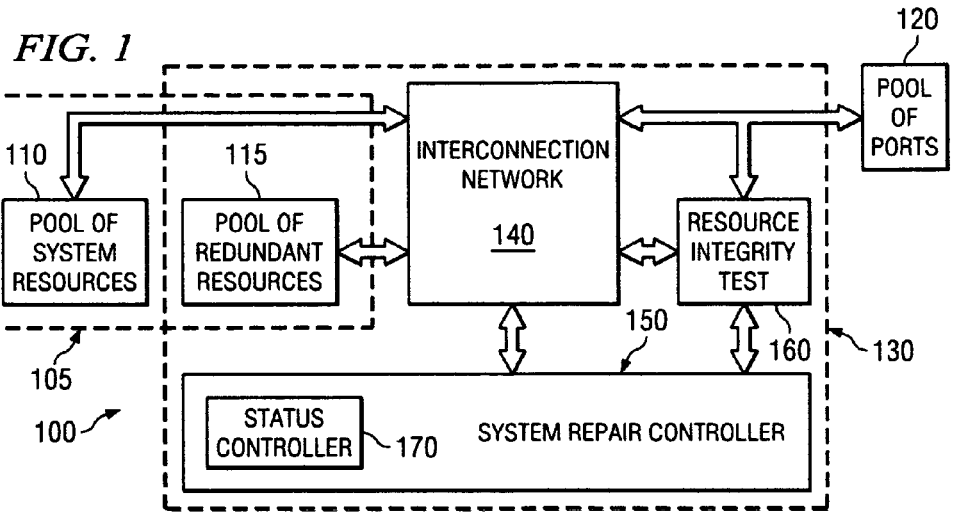
FIG. 1 is a block diagram of an exemplary system including a self-repair system that provides resource failure tolerance using redundant resources in accordance with embodiments of the present invention.

FIG. 1 is a block diagram of an exemplary system 100 including a self-repair system 130 that provides resource failure tolerance using resource redundancy to reduce the mean time between failures (MTBF), in accordance with embodiments of the present invention. The system 100 includes a pool of one or more system resources 110, the self-repair system 130 and a pool of ports 120 for connecting the system resources 110 to one or more consumers (not shown) of the system resources 110, such consumers of the system resources will hereinafter referred to as "sinks." Each port 120 within the pool of ports 120 is connectable to a respective sink. As used herein, the term "sink" 120 is defined as a device that communicates with one or more system resources 110 to perform a set of functions. In addition, as used herein, the term "system resource" 110 is defined as a device capable of performing a certain set of functions required by a sink connected to a port 110. In one embodiment, information is unidirectionally communicated between one or more of the system resources 110 and their respective sinks (i.e., from the system resources 110 to the sinks or from the sinks to the system resources 110). In another embodiment, information is bi-directionally communicated between one or more system resources 110 and their respective sinks.

For example, in one embodiment, the system 100 is a test system for testing one or more devices under test (DUTs). An example of a system resource 110 is a pattern generator that generates a test pattern, and an example of a sink is a DUT or part of a DUT that receives the test pattern. In other embodiments, the system 100 is an integrated circuit (IC) design system, an EDA tools system or other system employing system resources to perform a set of functions on a set of sinks.

The self-repair system 130 includes a pool of one or more redundant resources 115, an interconnection network 140, a system repair controller 150, a resource integrity tester 160 and a status controller 170. The pool of redundant resources 115 includes one or more resources that are redundant to one or more of the system resources 110. As used herein, the term "redundant" is defined as duplicative. For example, if one of the system resources 110 is a pattern generator, the pool of redundant resources 115 can include an additional pattern generator. The pool of system resources 110 and pool of redundant resources 115 are collectively referred to as "resources" 105.

The resources 105 are connected to the pool of ports 120 via the interconnection network 140. The interconnection network 140 is a switching network providing configurable paths between resources 105 and ports 120. Thus, the interconnection network 140 provides reconfigurable connections between ports 120 and system resources 110 and/or between ports 120 and redundant resources 115. For example, in one embodiment, the interconnection network 140 includes switches that selectably connect two or more resources 105 (i.e., system resources and/or redundant resources) to each port 120, depending on the level of redundancy required by the system. Examples of interconnection network architectures are shown in FIGS. 8-10 and described in more detail below.

The system repair controller 150 is operable to identify defective system resources 110 in the pool of system resources 110 using the resource integrity tester 160, as described in more detail below. If one or more system resources 110 is defective, the system repair controller 150 is further operable to execute a repair algorithm to attempt to repair the system 100 by restoring the functionality of the system 100. The algorithm takes as input the identified defective system resources and data representing the properties of the interconnection network 140 and operates to determine whether system repair is possible. Each defective system resource is connected to one or more ports 120 to serve one or more sinks. Thus, system repair is possible if the system can provide service to all sinks despite disconnection of the defective system resources.

In particular, the algorithm determines that system repair is possible if, for each sink served by a defective system resource, there exists a compatible resource capable of being connected to the sink through the interconnection network 140. As used herein, the term "compatible resource" represents a resource 105 that is capable of performing the same set of functions for a particular sink as another resource 105. Thus, a compatible resource for a particular defective system resource 110 is found in either the pool of redundant resources 115 or in the pool of system resources 110. For example, if a certain set of functions required by sink S can be performed by both resource A and resource B, then resource A and resource B are compatible resources capable of serving sink S. As another example, an analog resource can be considered a compatible resource to a digital resource for the purpose of performing a simple digital test.

If system repair is possible, the algorithm generates a mapping between resources 105 and ports 120 by replacing the defective system resources with compatible resources. After repair, the status controller 170 communicates status information to each compatible resource selected to replace a defective system resource. As used herein, the term "status information" refers to any information needed by the compatible resource to enable that compatible resource to serve a particular sink. For example, if resource A is defective and resource B is selected to replace resource A for sink S, the status controller 170 provides to resource B the status information needed by resource B to serve sink S. In one embodiment, the status controller 170 maintains the status information for resource A and forwards the status information to resource B. In another embodiment in which the resources 105 are provided with reliable data sources, the status controller 170 requests resource A to transfer the status information either directly to resource B or to the status controller 170, which then forwards the status information to resource B.

In an exemplary operation, the system repair controller 150 selects a compatible, non-defective resource for each port 120 connected to a defective system resource 110. More specifically, the system repair controller 150 accesses the interconnection network 140 to identify all of the ports 120 connected to each defective system resource 110. For each identified port 120, the system repair controller 150 determines if a repair is possible using a compatible resource for the sink connected to the identified port 120. If repair is possible, the system repair controller selects a compatible resource and causes the interconnection network 140 to disable the connection between the defective system resource 110 and the identified port 120 and to enable the connection between the selected compatible resource and the identified port 120. For example, if resource A and resource B are compatible resources that are both connected to port P serving sink S via a switch, and resource A is defective, the system repair controller 150 can set the switch to select resource B, thereby enabling the connection between port P and resource B and disabling the connection between port P and resource A.

The system repair controller 150 selects the compatible resource(s) to replace each defective system resource based on a cost associated with each of the potential compatible resources. As used herein, the term "cost" includes any quantifiable valuation associated with a potential compatible resource. One example of a cost is a monetary cost associated with the potential compatible resource itself. Another example of a cost is a mean time between failures (MTBF) of the potential compatible resource that quantifies failure rate associated with the potential compatible resource. A further example of a cost is a cost incurred by the interconnection network to connect the potential compatible resource to a sink served by the defective system resource. For example, the cost assigned to each potential compatible resource can be dependent upon the number of switches and/or number of outputs of each switch needed to connect potential compatible resource to a sink served by the defective system resource. Still a further example of a cost is a combination of a cost associated with the potential compatible resource (e.g., monetary or MTBF) and a cost associated with the interconnection network. Other types of costs are possible, and the present application is not limited to any particular cost. In addition, different types of cost can be used to evaluate different potential compatible resources.

In operation, the system repair controller 150 identifies one or more potential compatible resources to replace each defective system resource, determines a respective cost associated with each of the potential compatible resources and selects those compatible resources for which the value of the cost is least to replace the defective system resources. More specifically, the system repair controller 150 identifies all sinks served by a particular defective system resource, and for each sink, identifies one or more potential compatible resources that are able to replace the particular defective system resource. Thereafter, for each sink served by the defective system resource, the system repair controller 150 determines a respective cost associated with each of the potential compatible resources capable of serving the sink, and selects the compatible resource for which the cost is least to replace the particular defective system resource for that sink.

Thus, the number of compatible resources selected by the system repair controller 150 to replace defective system resources is determined in part by the number of sinks served by each defective system resource 110 and the available compatible resources for each sink. For example, if a defective system resource 110 serves two sinks, the defective system resource 110 can be replaced by a single compatible resource capable of serving both sinks or two different compatible resources, each capable of serving one of the sinks. Another factor contributing to the number of compatible resources selected by the system repair controller 150 is the type of compatible resources selected to replace defective system resources. For example, if defective system resource A is replaced by non-defective system resource B, resource B may not be able to concurrently serve both the sinks originally served by resource B and the additional sinks originally served by resource A. As a result, other compatible resource (s) may need to be selected to serve one or more of the sinks originally served by resource B or by resource A.

In one embodiment, once a cost has been determined for each potential compatible resource, the system repair controller 150 evaluates the cost individually for each potential compatible resource compatible with a particular defective system resource. For example, in an exemplary embodiment, the system repair controller 150 evaluates a cost for each compatible resource compatible with a particular defective system resource 110, and selects the compatible resource(s) to replace the defective system resource 110 having the lowest cost. For example, the system repair controller 150 can evaluate the cost by calculating the MTBF for each potential compatible resource of a particular defective system resource, and select one of the compatible resources having the lowest MTBF for each of the sinks served by the particular defective system resource.

In another embodiment, the system repair controller 150 determines the overall network cost for each configuration of the interconnection network 140 that results in replacement of all of the defective system resources 110, and selects the compatible resources associated with the network configuration for which the network cost is least. As used herein, the term "network cost" refers to a combination of individual costs assigned to either all resources or to a subset of the resources (e.g., only the potential compatible resources) in a particular network configuration. In an exemplary embodiment in which the interconnection network 140 includes switches connecting resources 105 to ports 120, the network cost assigned to each network configuration is dependent upon the total number of switches and/or total number of switch outputs utilized in the network configuration.

For example, in an exemplary embodiment, the system repair controller 150 identifies one or more network configurations from the interconnection network 140, in which each network configuration provides a connection between each of the ports 120 and either non-defective system resources 110 or redundant resources 115. The system repair controller 150 evaluates the network cost for each of the network configurations, and selects the network configuration for which the network cost is least. For example, the system repair controller 150 can evaluate the network cost for each network configuration by calculating the average, maximum or other combined MTBF of all resources that constitute part of each network configuration, and selecting the network configuration having the lowest MTBF.

As another example, instead of evaluating the MTBF for all possible network configurations, the system repair controller 150 can evaluate the network cost by using a heuristic to identify one or more network configurations for which the MTBF is calculated and selecting the one of the identified network configurations having the lowest MTBF. For example, the heuristic can be used to identify the "n" most likely network configurations that result in actual system repair.

The system repair controller 150 and status controller 170 each include hardware, software and/or firmware for performing the functions discussed herein. For example, the system repair controller 150 and status controller 170 may include one or more microprocessors, microcontrollers, programmable logic devices, digital signal processors or other similar processing devices. A single processing device may be used for both the system repair controller 150 and status controller 170, or separate processing devices may be used for the system repair controller 150 and status controller 170. As another example, the system repair controller 150 and status controller 170 include software stored in a storage device and executable by one or more processing devices. By way of example, but not limitation, such storage devices can include random access memory (RAM), read only memory (ROM), EEPROM, flash memory, cache memory or other type of storage medium. In addition, the system repair controller 150 and status controller 170 may be centrally located or distributed throughout the self-repair system 130.

The resource integrity tester 160 is operably connected to test the system resources 110 to determine whether one or more of the system resources 110 is defective. For example, in one embodiment, the resource integrity tester 160 tests for defective system resources 110 by checking stimulus signal signatures output from the system resources 110 via a system test bus (not shown). In another embodiment, the resource integrity tester 160 tests for defective system resources 110 by measuring the yield drop across the system resources 110 via a system test bus. Testing is performed either off-line or on-line. If testing is performed during operation of the system 100 (i.e., on-line), the resource integrity tester 160 instructs the interconnection network 140 to disconnect a particular system resource 110 under test from the one or more ports 120 that it serves and to connect one or more of the redundant resources 115 to the ports 120 disconnected from the system resource 110 under test to allow the system resource 110 under test to be tested without interrupting the operation of the system 100.

In yet another embodiment, the resource integrity tester 160 is implemented using one or more system resources 110 and one or more redundant resources 115 in a round-robin test configuration. For example, the resource integrity tester 160 can instruct the interconnection network 140 to interconnect pairs of the system resources 110 and redundant resources 115 to enable one of the resources 105 (system 110 or redundant 115) to measure the stimulus generated by another one of the resources 105 (system 110 or redundant 115). In embodiments in which the resources 105 are digital resources and each resource 105 produces a signature composed of a generated sequence of bits, the measuring resource 105 compares the signature produced by the resource 105 under test to an expected signature to determine whether the resource 105 under test is defective. In embodiments in which the resources 105 are analog resources, the measuring resource 105 uses a control to verify whether the resource 105 under test is defective.

Figure 2A:
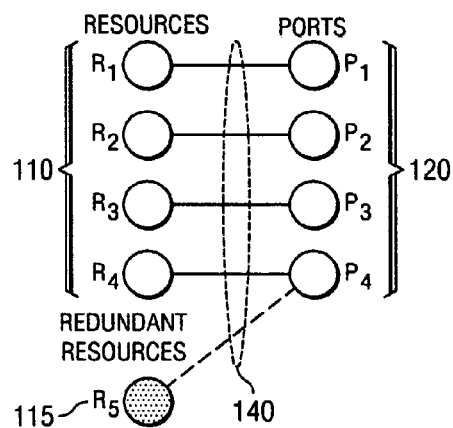
FIGS. 2A-2C are schematic diagrams that illustrates an exemplary configuration of the self-repair system in accordance with embodiments of the invention.
Figure 2B:
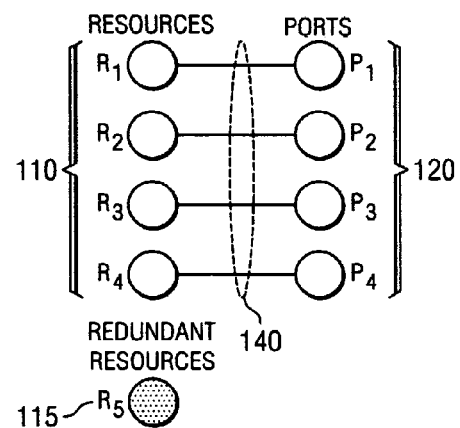
Figure 2C:
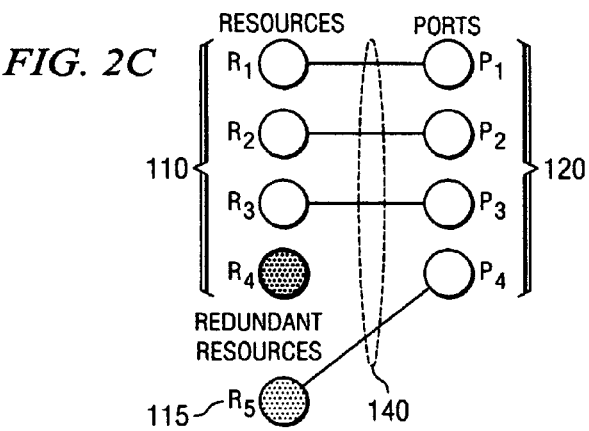

FIGS. 2A-2C are schematic diagrams that illustrate one self-repair system configuration providing resource failure tolerance in accordance with embodiments of the invention. In FIG. 2A, the pool of system resources 110 is represented by system resources R1, R2, R3 and R4, the pool of ports 120 is represented by ports P1, P2, P3 and P4 and the pool of redundant resources 115 is represented by redundant resource R5. A line (solid or broken) between a resource (R1 . . . R5) and a port (P1 . . . P4) indicates that the interconnection network 140 can connect the resource to the port. Solid lines represent default connections, while broken lines represent possible connections. In a properly functioning system, one of the resources (R1 . . . R5) is connected to each port (P1 . . . P4).

Thus, when no system resource is defective, as shown in FIG. 2B, system resource R1 is connected via the interconnection network 140 to port P1, system resource R2 is connected via the interconnection network 140 to port P2, system resource R3 is connected via interconnection network 140 to port P3 and system resource R4 is connected via interconnection network 140 to port P4. In addition, the connection between redundant resource R5 and port P4 via the interconnection network 140 is disabled. However, when system resource R4 is defective, as shown in FIG. 2C, redundant resource R5 replaces system resource R4, such that redundant resource R5 is connected via the interconnection network 140 to port P4 and the connection via the interconnection network 140 between system resource R4 and port P4 is disabled.

Figure 3A:
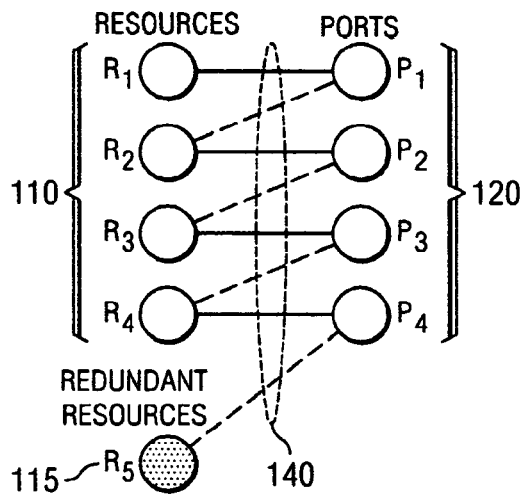
FIGS. 3A-3C are schematic diagrams that illustrates another exemplary configuration of the self-repair system in accordance with embodiments of the invention.
Figure 3B:
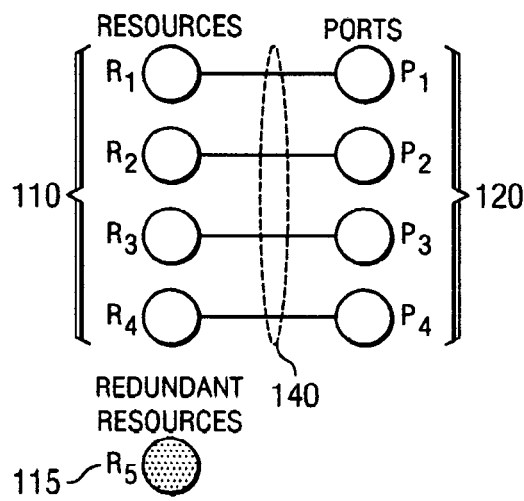
Figure 3C:
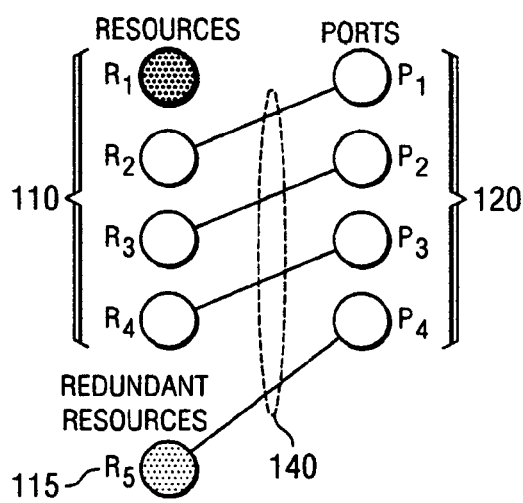

FIGS. 3A-3C are schematic diagrams that illustrate another exemplary self-repair system configuration in accordance with embodiments of the invention. In FIGS. 3A-3C, the pool of system resources 110 is again represented by system resources R1, R2, R3 and R4, the pool of ports 120 is again represented by ports P1, P2, P3 and P4 and the pool of redundant resources 115 is again represented by redundant resource R5. In addition, in FIG. 3A, a line (solid or broken) between a resource (R1 . . . R5) and a port (P1 . . . P4) indicates that the interconnection network 140 can connect the resource the port. Solid lines represent default connections, while broken lines represent possible connections.

As can be seen in FIG. 3A, the interconnection network 140 provides a tail-to-head configuration that maps system resources to multiple ports. For example, system resource R1 can be connected via the interconnection network 140 to port P1, system resource R2 can be connected via the interconnection network 140 to ports P1 and P2, system resource R3 can be connected via interconnection network 140 to ports P2 and P3 and system resource R4 can be connected via interconnection network 140 to ports P3 and P4. In addition, redundant resource R5 can also be connected to port P4 via the interconnection network 140.

Thus, the configuration shown in FIG. 3A allows the system to continue operate in the presence of any one defective system resource. As shown in FIG. 3B, when no resource is defective, system resource R1 is connected to port P1 via the interconnection network 140, system resource R2 is connected to port P2 via the interconnection network 140, system resource R3 is connected to port P3 via the interconnection network 140 and system resource R4 is connected to port P4 via the interconnection network 140. All other possible connections are disabled.

However, when, for example, system resource R1 is defective, as shown in FIG. 3C, the self-repair system changes the connections provided by the interconnection network 140 such that system resource R2 is connected to port P1 via the interconnection network 140, system resource R3 is connected to port P2 via the interconnection network 140, system resource R4 is connected to port P3 via the interconnection network 140 and redundant resource R5 is connected to port P4 via the interconnection network 140.

FIGS. 4A-4D are schematic diagrams illustrating yet another exemplary self-repair system configuration providing resource failure tolerance in accordance with embodiments of the present invention. In FIGS. 4A-4D, the pool of system resources 110 is again represented by system resources R1, R2, R3 and R4, the pool of ports 120 is again represented by ports P1, P2, P3 and P4, but the pool of redundant resources 115 is now represented by redundant resources R5 and R6. In addition, as in FIGS. 2A and 3A, in FIG. 4A, a line (solid or broken) between a resource (R1 . . . R6) and a port (P1 . . . P4) indicates that the interconnection network 140 can connect the resource to the port. Solid lines represent default connections, while broken lines represent possible connections.

Figure 4A:
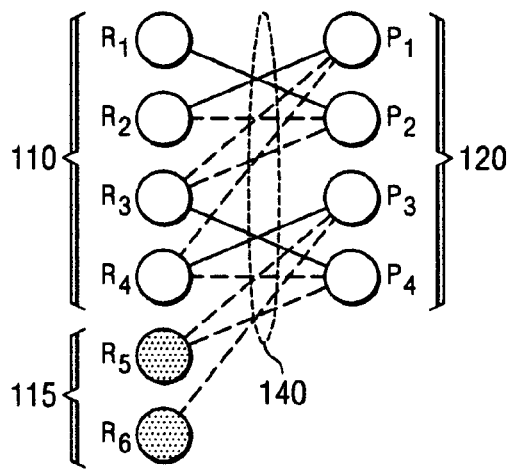
FIGS. 4A-4D are schematic diagrams illustrating yet another exemplary configuration of the self-repair system providing resource failure tolerance, in accordance with embodiments of the present invention.
Figure 4B:
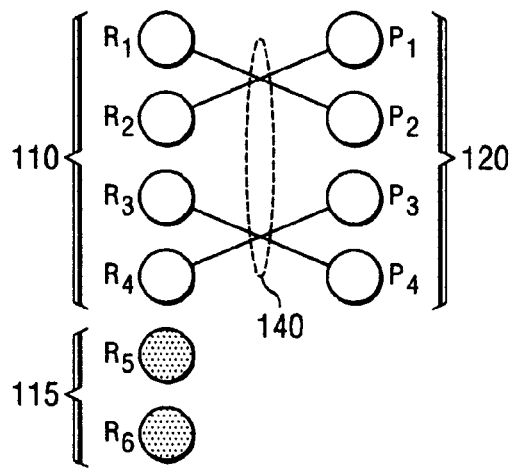

FIGS. 4A-4D illustrate a configuration that can tolerate up to two defective system resources. When no resource is defective, as shown in FIG. 4B, system resource R1 is connected to port P2 via the interconnection network 140, system resource R2 is connected to port P1 via the interconnection network 140, system resource R3 is connected to port P4 via the interconnection network 140 and system resource R4 is connected to port P3 via the interconnection network 140. All other possible connections are disabled.

Figure 4C:
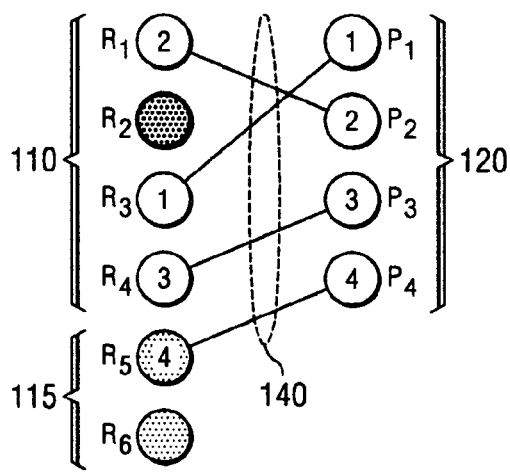
Figure 4D:
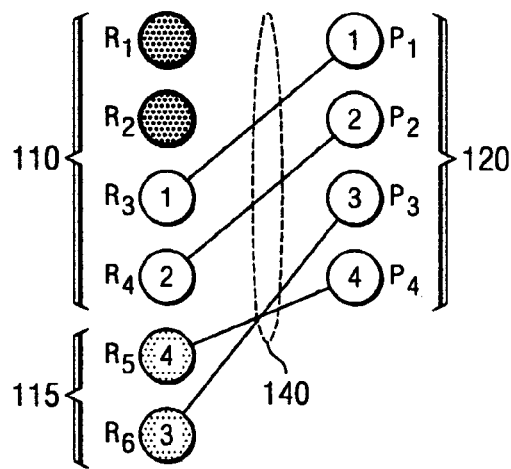

However, when, for example, as shown in FIG. 4C, system resource R2 is defective, the self-repair system changes the connections provided by the interconnection network 140 such that system resource R1 is connected to port P2 via the interconnection network 140, system resource R3 is connected to port P1 via the interconnection network 140, system resource R4 is connection to port P3 via the interconnection network 140 and redundant resource R4 is connected to port P4 via the interconnection network 140. In addition, when, as shown in FIG. 4D, both system resource R1 and system resource R2 are defective, the self-repair system changes the connections provided by the interconnection network 140 such that system resource R3 is connected to port P1 via the interconnection network 140, system resource R4 is connected to port P2 via the interconnection network 140, redundant resource R5 is connected to port P4 via the interconnection network 140 and redundant resource R6 is connected to port P3 via the interconnection network 140.

Figure 5A:
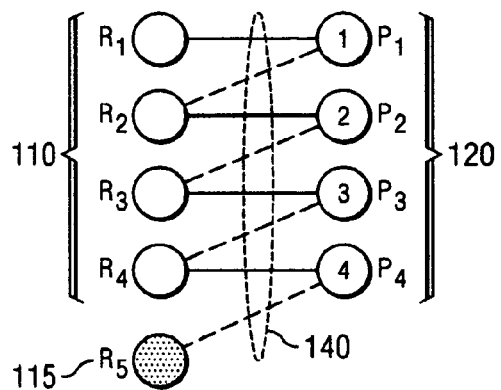
FIGS. 5A and 5B are schematic diagrams illustrating resource failure tolerance using time multiplexing, in accordance with embodiments of the present invention.
Figure 5B:
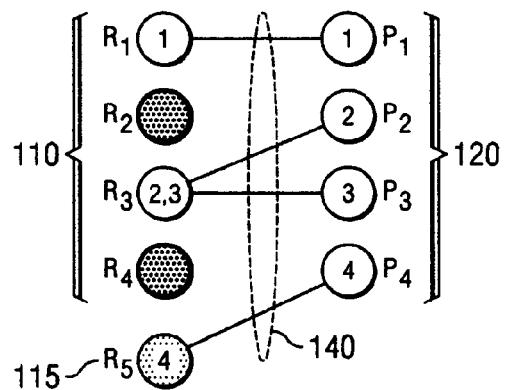

FIGS. 5A and 5B are schematic diagrams illustrating resource failure tolerance using time multiplexing in accordance with embodiments of the present invention. The self-repair system configuration shown in FIG. 5A is the same tail-to-head configuration shown in FIG. 3A. However, with time multiplexing, the configuration of FIG. 5A tolerates up to two defective system resources. Again, as shown in FIG. 5A, when no system resource is defective, the default connections (solid lines) in the interconnection network 140 are used to connect system resource R1 to port P1, system resource R2 to port P2, system resource R3 to port P3 and system resource R4 to port P4. However, when, for example, both system resource R2 and system resource R4 are defective, as shown in FIG. 5B, the self-repair system changes the connections provided by the interconnection network 140 such that system resource R1 is connected to port P1, system resource R3 is sequentially connected to ports P2 and P3 and redundant resource R5 is connected to port P4. Thus, the self-repair system time multiplexes system resource R3 to serve port P2 and P3 sequentially. However, depending on the type of system, sequential execution may impact the total run time.

Figure 6A:
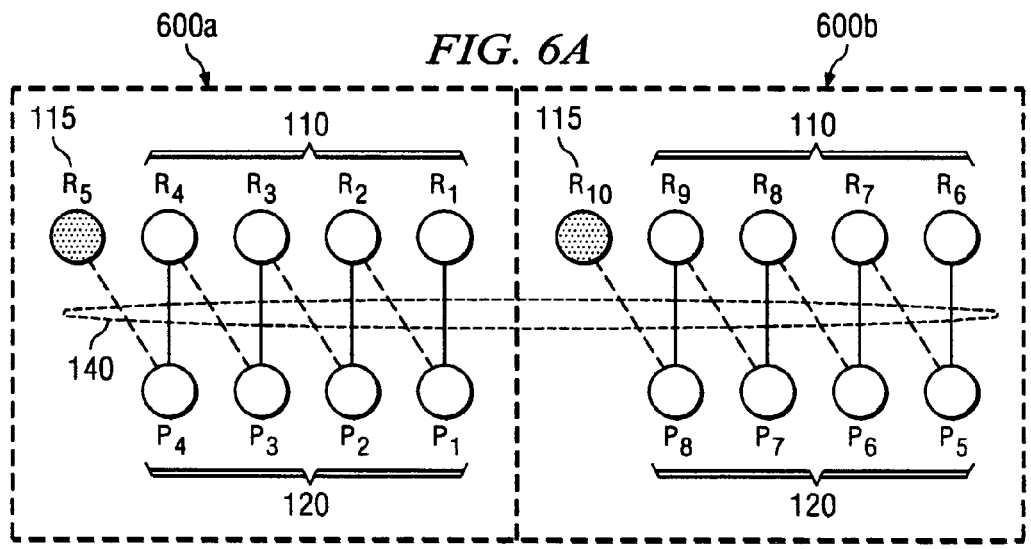
FIGS. 6A and 6B are schematic diagrams illustrating clustered resource redundancy for providing resource failure tolerance, in accordance with embodiments of the present invention.
Figure 6B:
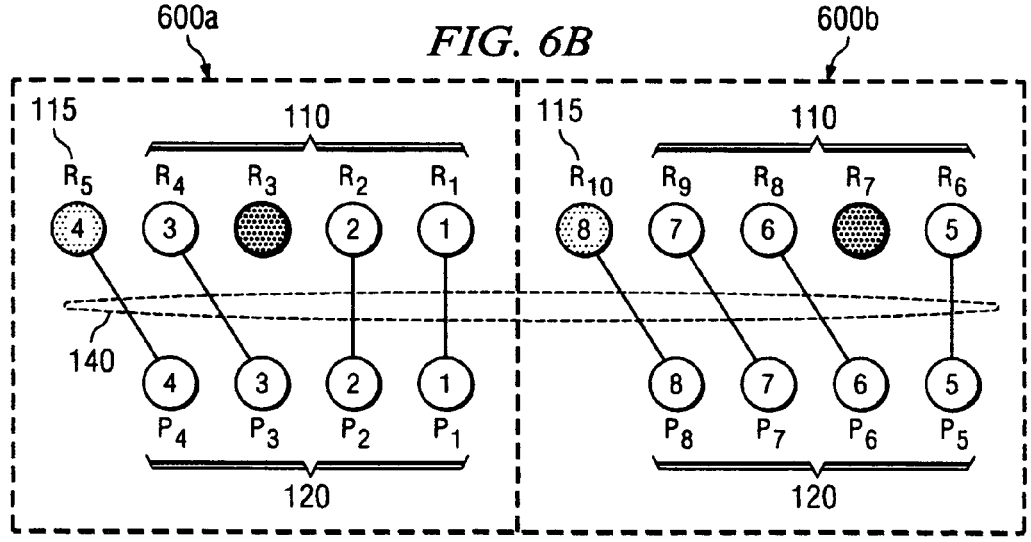

FIGS. 6A and 6B are schematic diagrams illustrating resource failure tolerance by using clustered resources in accordance with embodiments of the present invention. FIG. 6A presents a self-repair system configuration in which each cluster 600a and 600b of four system resources 110 serving four ports 120 has one redundant resource 115. Thus, cluster 600a includes system resources R1, R2, R3 and R4, ports P1, P2, P3 and P4 and redundant resource R5. Likewise, cluster 600b includes system resources R6, R7, R8 and R9, ports P5, P6, P7 and P8 and redundant resource R10. As shown by the solid lines, when no system resources are defective in either cluster 600a or 600b, the interconnection network 140 connects system resource R1 to port P1, system resource R2 to port P2, system resource R3 to port P3 and system resource R4 to port P4, system resource R6 to port P5, system resource R7 to port P6, system resource R8 to port P7 and system resource R9 to port P8.

In addition, as can be seen in FIG. 6A, each cluster 600a and 600b has the same tail-to-head configuration as that shown in FIG. 3A. As a result, each cluster 600a and 600b can tolerate up to one defective resource without time multiplex-ing. As a result, as shown in FIG. 6B, even when there are two defective resources in the system, if there is only one defective resource per cluster 600a and 600b, the system is still able to operate. Each cluster, for example, can be implemented on one board.

In a practical implementation, the number of redundant resources 115 per cluster 600, the number of clusters 600 and the number of resources (system resources 110 and redundant resources 115) connectable to each port 120 is optimized based on the MTBF requirements. For example, Table 1 below lists the maximum number of defective resources that can be tolerated per cluster 600 for a given number of clusters and a given number of resources connectable to each port when only one redundant resource 115 per cluster 600 is deployed.

| # of Resources Connectable to Each Port | # of Clusters | | | | | | | |
|---|---|---|---|---|---|---|---|---|
| | 1 | 2 | 3 | 4 | 5 | 6 | 7 | 8 |
| 3 | 2 | 2 | 2 | 2 | 2 | 2 | 2 | 2 |
| 5 | 3 | 4 | 4 | 4 | 4 | 4 | 4 | 3 |
| 7 | 4 | 5 | 6 | 6 | 6 | 6 | 6 | 4 |
| 9 | 5 | 6 | 7 | 8 | 8 | 7 | 6 | 5 |
| 11 | 6 | 7 | 8 | 8 | 8 | 8 | 7 | 6 |

Figure 7A:
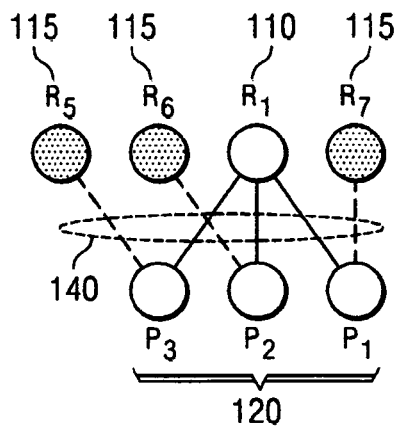
FIGS. 7A-7C are schematic diagrams illustrating resource failure tolerance for multiple sinks, in accordance with embodiments of the present invention.
Figure 7B:
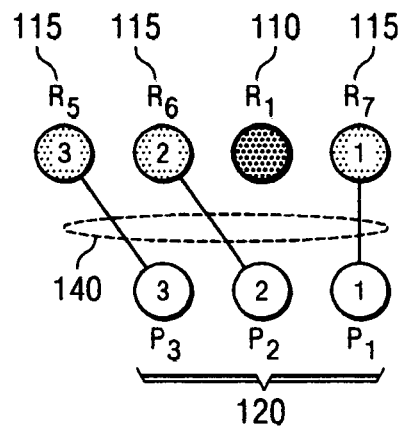
Figure 7C:
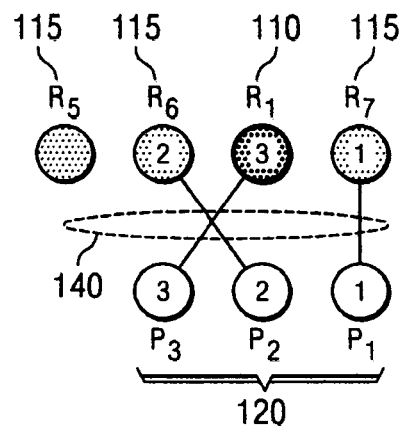

FIGS. 7A-7C are schematic diagrams illustrating resource failure tolerance for multiple ports, in accordance with embodiments of the present invention. In FIG. 7A, the pool of system resources 110 includes system resource R1, the pool of ports 120 includes ports P1, P2 and P3 and the pool of redundant resources 115 includes redundant resources R5, R6 and R7. System resource R1 serves three ports, P1, P2 and P3. Therefore, if system resource R1 is defective, the self-repair system needs to identify a compatible resource for each port P1, P2 and P3.

In one embodiment, as shown in FIG. 7B, defective system resource R1 is replaced by two or more redundant resources, here R5, R6 and R7. Thus, in FIG. 7B, the self-repair system changes the connections provided by the interconnection network 140 such that redundant resource R5 serves port P3, redundant resource R6 serves port P2 and redundant resource R7 serves port P1. In addition, in other embodiments, as shown in FIG. 7C, if system resource R1 is determined to be defective for fewer than all of the ports (e.g., system resource R1 is defective for only ports P1 and P2), the self-repair system changes the connections provided by the interconnection network 140 so that system resource R1 remains serving port P3, redundant resource R6 serves P2 and redundant resource R7 serves P1.

Turning now to FIGS. 8-10, there are a number of different architectures of interconnection network 140 that enable the self-repair system to replace defective resources using redundant resources. FIGS. 8-10 illustrate some examples of such architectures of interconnection network 140. However, other interconnection network architectures are possible, and the present invention is not limited to any of the specific examples shown in FIGS. 8-10.

Figure 8A:
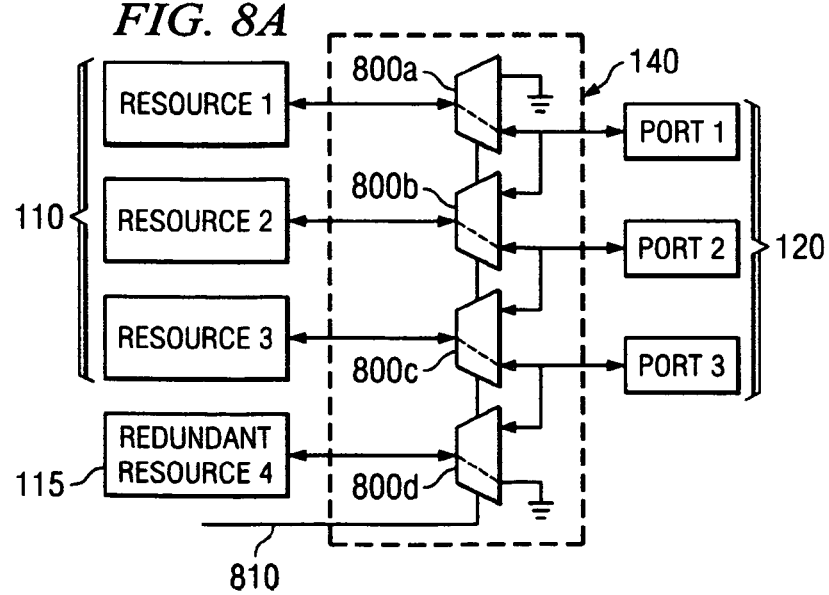
FIGS. 8A and 8B are schematic block diagrams illustrating an exemplary interconnection network, in accordance with embodiments of the present invention.
Figure 8B:
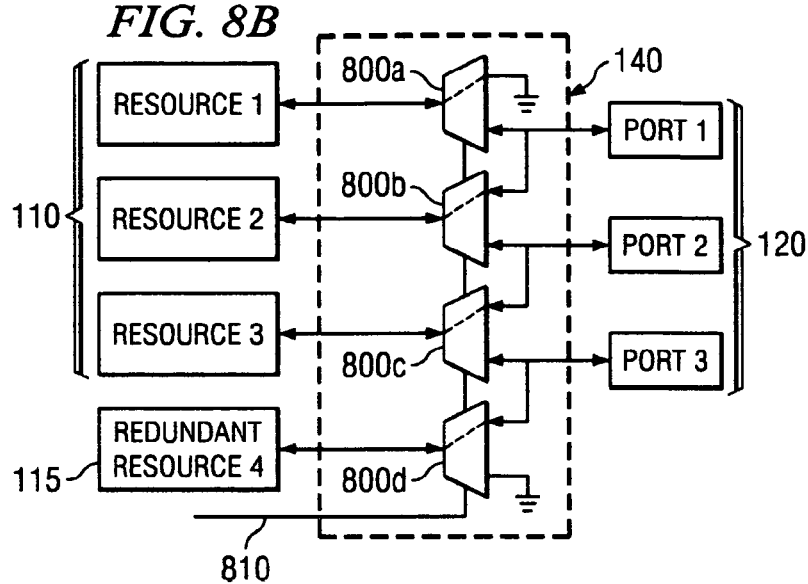

FIGS. 8A and 8B illustrate an exemplary interconnection network 140, in accordance with embodiments of the present invention. In FIGS. 8A and 8B, there are three system resources 110, labeled Resource 1, Resource 2 and Resource 3, one redundant resource 115, labeled Redundant Resource 4, three ports 120, labeled Port 1, Port 2 and Port 3, and switches 800a, 800b, 800c and 800d for connecting the system resources 110 and redundant resource 115 to the ports 120. Each system resource 110 and redundant resource 115 is connected to the input of a respective one of the switches 800a, 800b, 800c and 800d, while each port 120 connected to the output of two of the switches 800a, 800b, 800c and 800d.

For example, as shown in FIGS. 8A and 8B, Resource 1 is connected to the input of switch 800a, Resource 2 is connected to the input of switch 800b, Resource 3 is connected to the input of switch 800c and Redundant Resource 4 is connected to the input of switch 800d. In addition, Port 1 is connected to the outputs of switches 800a and 800b, Port 2 is connected to the outputs of switches 800b and 800c and Port 3 is connected to the outputs of switches 800c and 800d.

When no resource is defective, as is shown in FIG. 8A, a control signal 810, generated, for example, by system repair controller 150 (shown in FIG. 1), sets switch 800a to connect Resource 1 to Port 1, sets switch 800b to connect Resource 2 to Port 2, sets switch 800c to connect Resource 3 to Port 3 and sets switch 800d to connect Redundant Resource 4 to ground. However, when, for example, Resource R1 is determined to be defective, as shown in FIG. 8B, the control signal 810 sets switch 800a to connect Resource 1 to ground, sets switch 800b to connect Resource 2 to Port 1, sets switch 800c to connect Resource 3 to Port 2 and sets switch 800d to connect Redundant Resource 4 to Port 3.

Figure 9A:
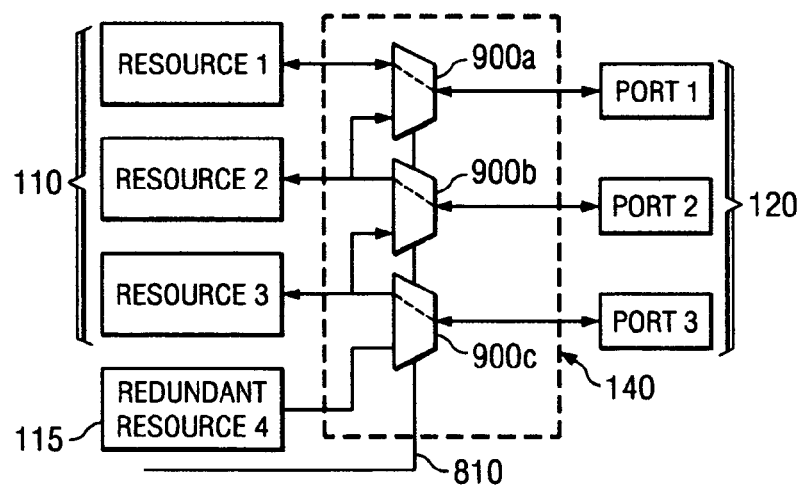
FIGS. 9A and 9B are schematic block diagrams illustrating another exemplary interconnection network, in accordance with embodiments of the present invention.
Figure 9B:
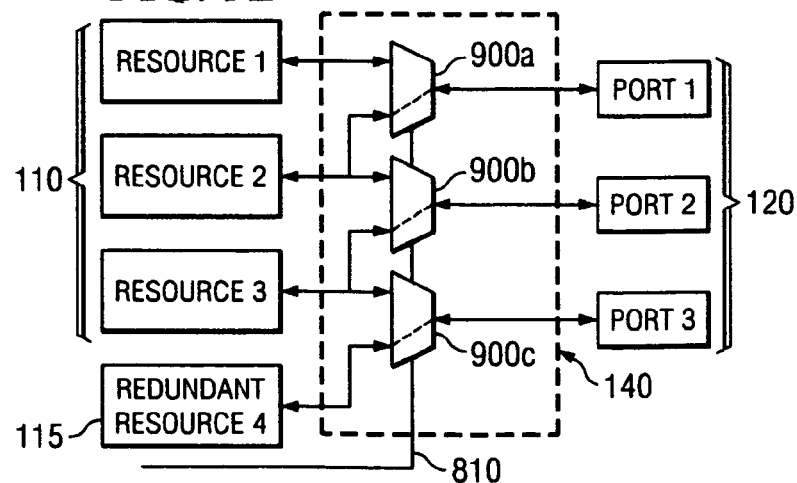

FIGS. 9A and 9B illustrate another exemplary interconnection network 140. In FIGS. 9A and 9B, each port 120 is connected to the output of a respective switch 900a, 900b and 900c, while one or more of the system resources 110 and redundant resources 115 are connected to the input of two of the switches 900a, 900b and 900c. For example, as shown in FIGS. 9A and 9B, Port 1 is connected to the output of switch 900a, Port 2 is connected to the output of switch 900b and Port 3 is connected to the output of switch 900c. In addition, Resource 1 is connected to the input of switch 900a, Resource 2 is connected to the inputs of switches 900a and 900b, Resource 3 is connected to the inputs of switches 900b and 900c and Redundant Resource 4 is connected to the input of switch 900c.

When no resource is defective, as is shown in FIG. 9A, control signal 810 sets switch 900a to connect Resource 1 to Port 1, sets switch 900b to connect Resource 2 to Port 2 and sets switch 900c to connect Resource 3 to Port 3. However, when, for example, Resource R1 is determined to be defective, as shown in FIG. 9B, control signal 810 sets switch 900a to connect Resource 2 to Port 1, sets switch 900b to connect Resource 3 to Port 2 and sets switch 900c to connect Redundant Resource 4 to Port 3.

Figure 10A:
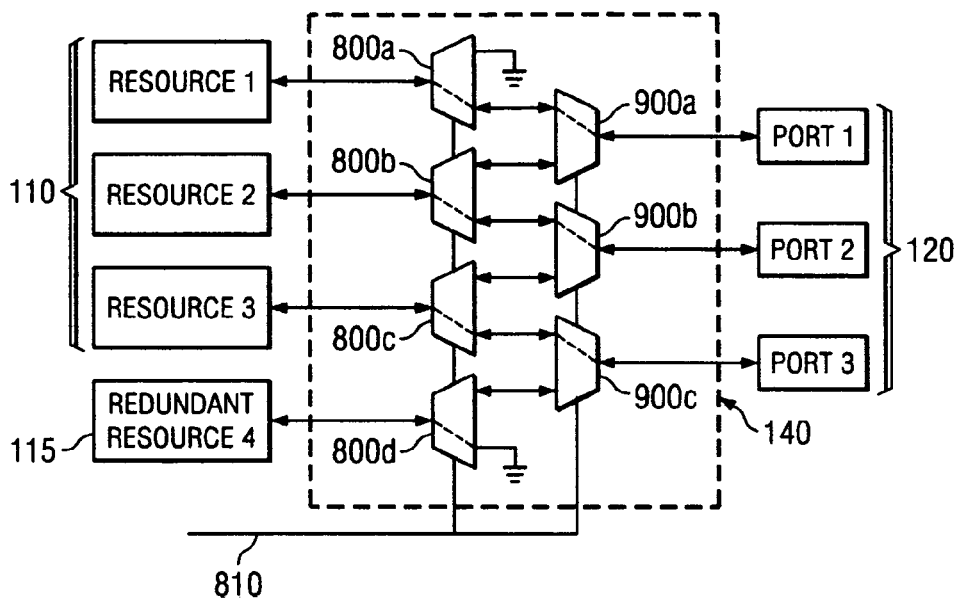
FIGS. 10A and 10B are schematic block diagrams illustrating yet another exemplary interconnection network, in accordance with embodiments of the present invention.
Figure 10B:
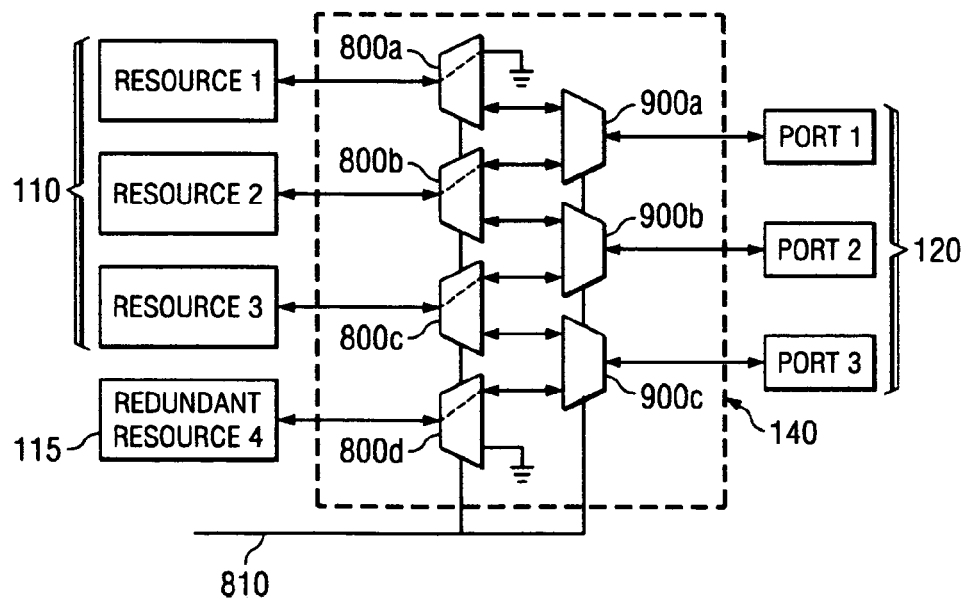

FIGS. 10A and 10B illustrate yet another exemplary interconnection network 140. In FIGS. 10A and 10B, each system resource 110 and redundant resource 115 is connected to the input of a respective one of the switches 800a, 800b, 800c and 800d, while each port 120 connected to the output of a respective one of the switches 900a, 900b and 900c. Each of the switches 900a, 900b and 900c has two inputs connected to the outputs of two different ones of the switches 800a, 800b, 800c and 800d.

For example, as shown in FIGS. 10A and 10B, Resource 1 is connected to the input of switch 800a, Resource 2 is connected to the input of switch 800b, Resource 3 is connected to the input of switch 800c and Redundant Resource 4 is connected to the input of switch 800d. In addition, Port 1 is connected to the output of switch 900a, Port 2 is connected to the output of switches 900b and Port 3 is connected to the output of switch 900c. The inputs of switch 900a are connected to the outputs of switches 800a and 800b, the inputs of switch 900b are connected to the outputs of switches 800b and 800c and the inputs of switch 900c are connected to the outputs of switches 800c and 800d.

When no resource is defective, as is shown in FIG. 10A, control signal 810 sets switch 800a and switch 900a to connect Resource 1 to Port 1, sets switch 800b and switch 900b to connect Resource 2 to Port 2, sets switch 800c and switch 900c to connect Resource 3 to Port 3 and sets switch 800d to connect Redundant Resource 4 to ground. However, when, for example, Resource R1 is defective, as shown in FIG. 10B, control signal 810 sets switch 800a to connect Resource 1 to ground, sets switch 800b and switch 900a to connect Resource 2 to Port 1, sets switch 800c and switch 900b to connect Resource 3 to Port 2 and sets switch 800d and switch 900c to connect Redundant Resource 4 to Port 3.

FIG. 11 is a flow chart that illustrates an exemplary process 1100 for providing resource failure tolerance in accordance with embodiments of the present invention. Initially, at block 1110, an interconnection network is provided that provides connections between resources (system resources and redundant resources) and ports, in which each port is connectable to a respective sink. At block 1120, the system resources are tested to identify any defective system resources. At block 1130, a determination is made whether any of the system resources are defective.

If so, at block 1140, for each defective resource, one or more compatible resources compatible with the defective system resource are identified for each port served by the defective system resource. Each compatible resource is either another non-defective system resource or a redundant resource redundant to the defective system resource. For example, assuming that system resource A, system resource B and redundant resource C are capable of serving port D, if system resource A is defective, system resource B and redundant resource C are both identified as compatible resources to replace system resource A and serve port D. Thereafter, at block 1150, a cost associated with each of the compatible resources is determined for each of the ports served by the defective system resource. The costs may be determined at the individual resource level or at the network level, the latter being described below in connection with FIG. 12. Examples of costs include, but are not limited to, a monetary cost associated with the potential compatible resource itself, a mean time between failures (MTBF) of the potential compatible resource that quantifies failure rate associated with the potential compatible resource, a cost is a cost incurred by the interconnection network to connect the potential compatible resource to a sink served by the defective system resource and a combination of a cost associated with the potential compatible resource (e.g., monetary or MTBF) and a cost associated with the interconnection network. Other types of costs are possible, and the present application is not limited to any particular cost. In addition, different types of cost can be used to evaluate different potential compatible resources.

Finally, at block 1160, one of the compatible resources is selected to replace the defective system resource for each of the ports served by the defective system resource based on the determined costs. Continuing with the example described above, a cost is determined for both system resource B and redundant resource C, and either system resource B or redundant resource C is selected to replace defective system resource A to serve port D based on the determined costs. As another example, assuming defective system resource A also serves port E and system resource B and redundant resource C are both also compatible with defective system resource A for port E, respective costs are determined for system resource B and redundant resource C for port D and additional respective costs are determined for system resource B and redundant resource C for port E. Thus, system resource B may be selected to replace defective system resource A for both ports D and E, redundant resource C may be selected to replace defective system resource A for both ports D and E or one of system resource B and redundant resource C may be selected to replace defective system resource A to serve port D and the other of system resource B and redundant resource C may be selected to replace defective system resource A to serve port E.

FIG. 12 is a flow chart that illustrates an exemplary process 1200 for determining costs in accordance with embodiments of the present invention. Initially, at block 1210, one or more interconnection network configurations for connecting the system resources and redundant resources to the ports are identified. Each configuration includes a certain number of paths (e.g., switches) that provide connections between the resources (system resources and redundant resources) and the ports, such that only one resource (system or redundant) is connected to each port.

At block 1230, the network cost of each interconnection network configuration is determined. For example, each configuration can be analyzed to determine the number of switches in each configuration, the ability to replace defective resources in each configuration and the average MTBF in each configuration. At block 1230, the optimum interconnection network configuration is selected based on the network cost determinations. For example, the configuration that minimizes the number of switches, while improving the ability to replace defective resources to likewise improve the MTBF can be selected as the optimum interconnection network configuration.

The innovative concepts described in the present application can be modified and varied over a wide rage of applications. Accordingly, the scope of patented subject matter should not be limited to any of the specific exemplary teachings discussed, but is instead defined by the following claims.

We claim:

1. A self-repair system for providing resource failure tolerance in a system comprising ports and system resources, each of the ports connectable to a respective resource consumer that consumes one or more of the system resources, the self-repair system comprising:
  redundant resources at least partially duplicative of the system resources;
  an interconnection network connected to said system resources, said redundant resources and said ports, said interconnection network providing interconnection information identifying connections between said system resources and said ports; and
  a controller operable to perform operations comprising:
    identifying, in response to said interconnection information, an affected one of said ports connected by said interconnection network to a defective one of said system resources,
    identifying, from among said system resources and said redundant resources, compatible resources capable of replacing said defective one of said system resources,
    determining respective networks costs for configuration of the interconnection network that result in replacement of the defective one of said system resources with one of said compatible resources, said configurations of the interconnection network including at least one configuration that results in replacement of at least one non-defective resource,
    in response to said determined network costs, selecting one of said compatible resources as a replacement resource, and
    configuring said interconnection network to implement one of said configurations, the configuration including connecting said replacement resource to said affected one of said ports instead of said defective one of said system resources.

2. The system of claim 1, wherein said operations additionally comprise communicating to said replacement resource information to enable said replacement resource to serve said affected one of the ports.

3. The system of claim 1, wherein:
  said determining said network costs comprises estimating a mean time between failures for each of said configurations; and
  said operations additionally comprises selecting the one of said configurations having the greatest mean time between failures.

4. The system of claim 3, wherein said identifying said configurations comprises identifying said configurations using a heuristic.

5. The system of claim 1, wherein:
  said interconnection network connects more than one of said ports to said defective one of said system resources, each of said more than one of said ports being an affected one of said ports;
  said determining said network costs comprises estimating a mean time between failures for each of said affected ones of said ports; and
  said operations additionally comprise selecting, for each of said affected ones of said ports, a respective one of said compatible resources having the greatest mean time between failures.

6. The system of claim 1, wherein said determining said network costs additionally comprises assigning to each one of said compatible resources a respective cost depending on the number of switches needed to connect said one of said compatible resources to said affected one of said ports.

7. The system of claim 1, wherein said interconnection network comprises an array of controllable switches interposed between (a) said system resources and said redundant resources, and (b) said ports, said controllable switches controlled by said controller.

8. The system of claim 1, wherein said interconnection network is operable to time multiplex one of said system resources to provide said replacement resource.

9. The system of claim 1, wherein:
  said system resources and said redundant resources are organized in clusters; and
  said defective one of said system resources and said compatible resources therefor are members of the same one of said clusters.

10. The system of claim 1, further comprising:
  a resource integrity tester operable to identify said defective one of said system resources.

11. The system of claim 10, wherein said resource integrity tester comprises one or more of said system resources and one or more of said redundant resources in a round-robin test configuration.

12. The system of claim 10, wherein said resource integrity tester comprises a signature analyzer.

13. The system of claim 1 wherein said interconnection network is interposed between said system resources, said redundant resources and said ports.

14. A method for providing resource failure tolerance in a system comprising ports, system resources and an interconnection network interposed therebetween, each of said ports connectable to a respective resource consumer that consumes one or more of said system resources, the method comprising:

providing redundant resources;
identifying a defective one of said system resources and an affected one of said ports connected to said defective one of said system resources;
from said system resources and said redundant resources, identifying compatible resources that are capable of replacing said defective one of said system resources;
determining respective network cost for configurations of the interconnection network that result in replacement of the defective one of said system resources with one of said compatible resources, said configurations of the interconnection network including at least one configuration that results in replacement of at least one non-defective resource;
in response to said determined network costs, selecting one of said compatible resources as a replacement resource; and
configuring said interconnection network to implement one of said configurations, said configuring including replacing said defective one of said system resources with said replacement resource such that said replacement resource is connected to the affected one of said ports via said interconnection network.

15. The method of claim 14, additionally comprising communicating information for serving said affected one of said ports to said replacement resource.

16. The method of claim 14, wherein:
said determining said network costs comprises estimating a mean time between failures for each of said configurations; and
said selecting said replacement resource additionally comprises selecting the one of said configurations having the greatest mean time between failures.

17. The method of claim 14, wherein said identifying said configurations comprises identifying said configurations using a heuristic.

18. The method of claim 14, wherein:
said determining said network costs comprises estimating a mean time between failures for each of said compatible resources; and
said selecting additionally comprises selecting the one of said compatible resources having the greatest mean time between failures as said replacement resource.

19. The method of claim 14, further comprising applying time multiplexing to one of said system resources to provide said replacement resource.

20. The method of claim 14, wherein said identifying said defective one of said system resources comprises:
connecting one or more of said system resources and one or more of said redundant resources in a round-robin test configuration; and
identifying said defective one of said system resources from said round-robin test configuration.

21. A method for providing resource failure tolerance in a system, the method comprising:
providing a plurality of system resources;
providing a plurality of ports;
providing an interconnection network interposed between said system resources and said ports;
identifying at least a defective one of said system resources and at least an affected one of said ports that is connected to the defective one of said system resources through said interconnection network;
identifying, from among said system resources, at least one compatible resource that is capable of replacing said defective one of said system resources;
determining respective network costs for configurations of the interconnection network that result in replacement of the defective one of said system resources with one of said compatible resources, said configurations of the interconnection network including at least one configuration that results in replacement of at least one non-defective resource;
in response to said determined network costs, selecting one of said compatible resources as a replacement resource; and
configuring the interconnection network to implement one of said configurations, the configuring including replacing said defective one of said system resources with said replacement resource.

22. The method of claim 21, wherein:
a first network configuration of the interconnection network characterizes connections between said system resources and said ports prior to replacement of said defective one of said system resources, and a second network configuration of the interconnection network characterizes connections between said system resources and said ports after replacement of said defective one of said system resources; and
configuring the interconnection network comprises controlling said interconnection network to switch between said first network configuration and said second network configuration.

23. The method of claim 22, wherein controlling said interconnection network comprises generating at least one control signal from a system repair controller to toggle a state of at least one switch in the interconnection network between a system resource and a port.

24. The method of claim 23, wherein toggling a state of at least one switch in the interconnection network comprises toggling states of a plurality of switches in the interconnection network.

25. The method of claim 21, wherein said defective one of said system resources is connected to at least two of said ports, and said configuring of the interconnection network connects said replacement resource to the at least two of said ports.

26. A self-repair system providing resource failure tolerance, comprising:
a plurality of system resources;
a plurality of ports;
an interconnection network interposed between said system resources and said ports; and
a controller operable to perform operations comprising:
identifying at least a defective one of said system resources and at least an affected one of said ports that is connected to the defective one of said system resources through said interconnection network;
identifying, from among said system resources, at least one compatible resource as a replacement resource that is capable of replacing said defective one of said system resources;
determining respective network costs for configurations of the interconnection network that result in replacement of the defective one of said system resources with one of said compatible resources, said configurations of the interconnection network including at least one configuration that results in replacement of at least one non-defective resource;
in response to said determined network costs, selecting one of said compatible resources as a replacement resource; and configuring the interconnection network to implement one of said configurations, the configuring including replacing said defective one of said system resources with said replacement resource.

27. The self-repair system of claim 26, wherein said interconnection network includes a plurality of switches interposed between said system resources and said ports.

28. The self-repair system claim 26, wherein said controller is further operable to generate at least one control signal to toggle a state of at least one of said switches to interconnect the affected one of said ports to said replacement resource.

29. The self-repair system of claim 27, wherein said plurality of switches includes a plurality of multiplexers.

30. The self-repair system of claim 27, wherein said plurality of switches includes a plurality of de-multiplexers.

31. The self-repair system of claim 27, wherein said plurality of switches includes a plurality of interconnected pairs of multiplexers and de-multiplexers.

32. The self-repair system of claim 26 wherein said defective one of said system resources is connected to at least two of said ports, and said controller is further operable to cause said interconnection network to connect said replacement resource to said at least two of said ports.

* * * * *